United States Patent
Gusat et al.

(10) Patent No.: US 11,243,833 B2
(45) Date of Patent: Feb. 8, 2022

(54) PERFORMANCE EVENT TROUBLESHOOTING SYSTEM

(71) Applicant: International Business Machines Corporation, Armonk, NY (US)

(72) Inventors: Mitch Gusat, Langnau a.A. (CH); Monney Serge, Pully (CH); Ioana Giurgiu, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 16/867,292

(22) Filed: May 5, 2020

(65) Prior Publication Data

US 2021/0349773 A1   Nov. 11, 2021

(51) Int. Cl.
*G06F 11/07* (2006.01)

(52) U.S. Cl.
CPC ........ *G06F 11/079* (2013.01); *G06F 11/0778* (2013.01); *G06F 11/0793* (2013.01)

(58) Field of Classification Search
CPC . G06F 11/079; G06F 11/0778; G06F 11/0793
See application file for complete search history.

(56) References Cited

U.S. PATENT DOCUMENTS

| | | | | |
|---|---|---|---|---|
| 7,369,932 B2 * | 5/2008 | Kim | ........................ | F01D 21/00 477/30 |
| 9,122,602 B1 * | 9/2015 | Jewell | .................... | G06F 11/079 |
| 9,961,571 B2 | 5/2018 | Yang | | |
| 10,102,054 B2 | 10/2018 | Wolf | | |
| 2015/0033084 A1 | 1/2015 | Sasturkar | | |

(Continued)

FOREIGN PATENT DOCUMENTS

| | | |
|---|---|---|
| CN | 104216941 A | 10/2017 |
| CN | 110059904 A | 7/2019 |
| WO | 2011050091 A2 | 4/2011 |

OTHER PUBLICATIONS

"Performance metrics for resources that run IBM Spectrum Virtualize", 21 pps., <https://www.ibm.com/support/knowledgecenter/SS5R93_5.2.16/com.ibm.spectrum.sc.doc/tpch_r_metrics_svc.html#tpch_r_metrics_svc.dita__v_response_times>.

(Continued)

*Primary Examiner* — Nadeem Iqbal
(74) *Attorney, Agent, or Firm* — William H. Hartwell; Daniel R. Simek

(57) ABSTRACT

Aspects of the present invention disclose a method and system for troubleshooting. The method includes identifying data sources providing sensor data, including a first group of measurands. The method further includes processors determining that values of a second group of the measurands of a subset of the sensor data (provided by a given data source, comprising a component set) indicates an anomaly. The method further includes determining a third group of the measurands that are root cause candidates of the anomaly. The measurands of the third group are provided by the component set. The method further includes assigning a set of coefficients to respective measurands. Each coefficient is indicative of a comparison result of each measurand with a measurand of the third group. The method further includes determining, using the sets of coefficients, whether a specific subset of the component set can be identified as an anomaly root cause.

20 Claims, 4 Drawing Sheets

(56) References Cited

U.S. PATENT DOCUMENTS

| | | |
|---|---|---|
| 2015/0294249 A1 | 10/2015 | Kaya |
| 2015/0339263 A1 | 11/2015 | Abu El Ata |
| 2016/0246662 A1 | 8/2016 | Meng |
| 2016/0359728 A1 | 12/2016 | Ficara |
| 2018/0129970 A1 | 5/2018 | Gottschlich |
| 2018/0248905 A1 | 8/2018 | Côté |
| 2018/0278640 A1 | 9/2018 | Modani |
| 2019/0317848 A1 | 10/2019 | Meusel |
| 2021/0073060 A1* | 3/2021 | Grant ................. G06F 11/004 |

OTHER PUBLICATIONS

"tslearn's documentation", Copyright 2017, 2 pps., Romain Tavenard, <https://tslearn.readthedocs.io/en/latest/>.

Bowman et al., "Generating Sentences from a Continuous Space", Proceedings of The 20th SIGNLL Conference on Computational Natural Language Learning, Aug. 2016, pp. 10-21, <https://doi.org/10.18653/v1/K16-1002>.

D'Avino et al., "Autoencoder with recurrent neural networks for video forgery detection", Electronic Imaging, Media Watermarking, Security, and Forensics 2017, pp. 92-99(8)2017, <https://doi.org/10.2352/ISSN.2470-1173.2017.7. MWSF-330>.

Kathareios, et al., "Catch It If You Can: Real-Time Network Anomaly Detection With Low False Alarm Rates", 2017 16th IEEE International Conference on Machine Learning and Applications (ICMLA), Dec. 2017, 6 pps.

Sabokrou, et al., "Deep-Cascade: Cascading 3D Deep Neural Networks for Fast Anomaly Detection and Localization in Crowded Scenes", 2017, IEEE Transactions on Image Processing, 26(4), 13 pps., <https://doi.org/10.1109/TIP.2017.2670780>.

Srivastava et al., "Unsupervised Learning of Video Representations using LSTMs", 2015, 12 pps., <https://doi.org/citeulike-article-id:13519737>.

U.S. Appl. No. 16/866,884, filed May 5, 2020.

List of IBM Patents and Patent Applications Treated as Related (Appendix P), filed herewith.

"Performance Event Troubleshooting System", Patent Cooperation Treaty Application No. IB2021053396, filed on May 5, 2020, 41 pages.

Patent Cooperation Treaty PCT, International Search Report, and Written Opinion of The International Searching Authority, dated Aug. 12, 2021, International application No. PCT/IB2021/053396, Applicant's or agent's file reference P201902950, International filing date Apr. 25, 2021, 7 pages.

* cited by examiner

PERFORMANCE EVENT TROUBLESHOOTING SYSTEM

BACKGROUND OF THE INVENTION

The present invention relates generally to the field of digital computer systems, and more particularly to performance event troubleshooting.

Petabytes of data are being gathered in public and private clouds, with time series data originating from various data sources, including sensor networks, smart grids, etc. The collected time series data may have an unexpected change or a pattern indicating an anomaly. Monitoring data for detecting root causes in real-time may, for example, prevent such anomalies from accumulating and affecting the efficiency of computer systems.

SUMMARY

Aspects of the present invention disclose a method, computer program product, and system for a troubleshooting system. The method includes one or more processors identifying data sources, the data sources being configured to provide sensor data and timestamping of the sensor data as a first set of one or more time series, the sensor data comprising values of a first group of measurands. The method further includes one or more processors determining that values of a second group of one or more of the measurands of a subset of the sensor data indicates an anomaly. The subset of sensor data is provided by a given data source of the data sources and covering a time window, the given data source comprises a set of components. The method further includes one or more processors determining a third group of one or more of the measurands that are root cause candidates of the anomaly using a set of one or more similarity techniques for comparing the values of the second group of measurands and the third group of measurands in the time window. The measurands of the third group are provided by the set of components. For each similarity technique of the set of similarity techniques and for each measurand of the second group, the method further includes one or more processors assigning a set of coefficients to the measurand. Each coefficient of the set of coefficients is indicative of a comparison result of the each measurand with a measurand of the third group using the similarity technique. The method further includes one or more processors determining using the sets of coefficients, whether a specific subset of the set of components of the given data source can be identified as a root cause of the anomaly. In response to determining that a specific subset of the set of components of the given data source can be identified as a root cause of the anomaly, the method further includes one or more processors providing the specific subset of components as a root cause of the anomaly.

In a further aspect, in response to determining that no specific subset of the set of components of the given data source can be identified as a root cause of the anomaly, the method further includes one or more processors updating the third group of measurands. For each similarity technique of the set of similarity techniques and for each measurand of the second group, the method further includes one or more processors assigning a set of coefficients to the measurand. Each coefficient of the set of coefficients is indicative of the comparison result of the each measurand with a measurand of the updated third group using the similarity technique. The method further includes one or more processors determining using the sets of coefficients, whether a specific subset of the set of components of the given data source can be identified as a root cause of the anomaly.

The present subject matter may enable a dynamically and automatically root cause analysis method. The present subject matter may improve root cause analysis on real data. For example, as data accumulates over time, the accuracy of the root cause analysis may increase. Embodiments of the present invention recognize that an increase in accuracy can be advantageous because information that may be viewed initially as an anomaly, may later be revealed to be a deviation that is not abnormal. Various embodiments of the present invention can perform the root cause analysis in real-time (e.g., while data sources are providing time series data).

The present subject matter may seamlessly be integrated with existing root cause analysis systems. For example, various embodiments of the present invention can enable an ensemble-based similarity retrieval tool for automatic root cause analysis troubleshooting (RCA/TS) in datacenter storages. Further, embodiments of the present invention can provide a timely and accurate root cause analysis troubleshooting, which can ensure that a cloud and datacenter-hosted applications operate without access, data or performance loss.

BRIEF DESCRIPTION OF THE DRAWINGS

In the following embodiments of the invention are explained in greater detail, by way of example only, making reference to the drawings.

DETAILED DESCRIPTION

Figure 1:
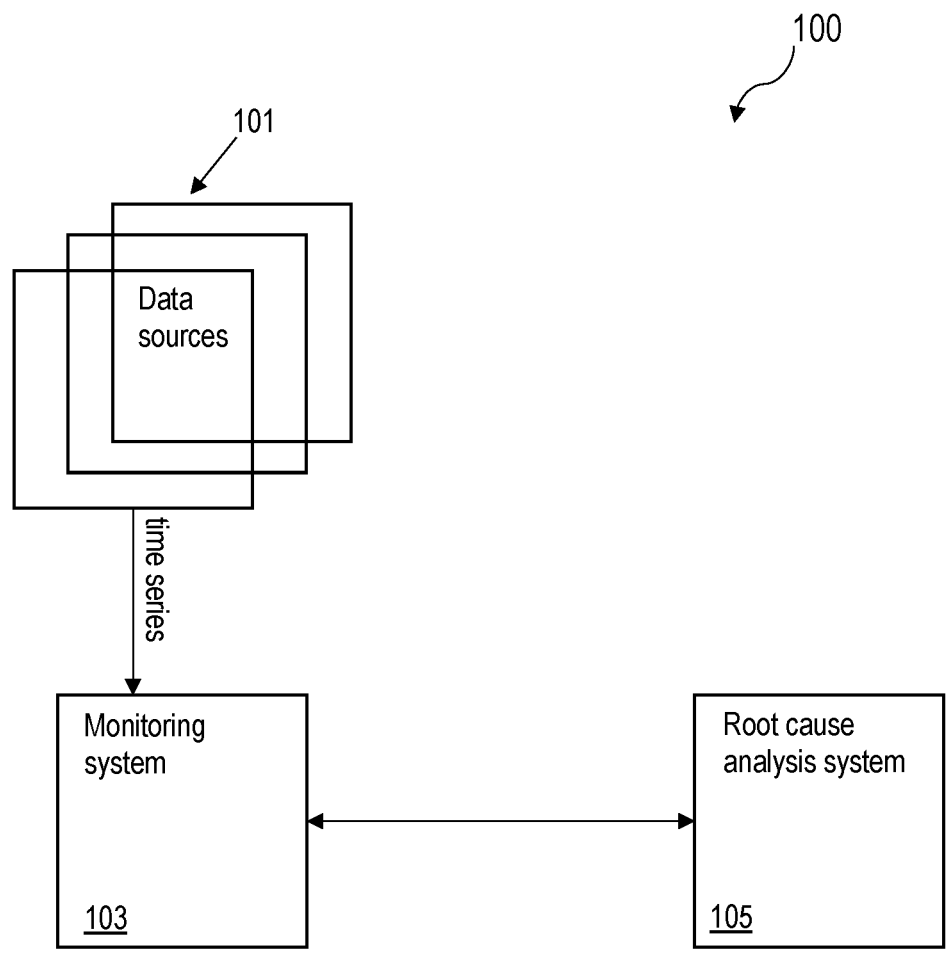
FIG. 1 is a block diagram of a computer system, in accordance with embodiments of the present invention.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various embodiments provide a root cause analysis method, computer system and computer program product as described by the subject matter of the independent claims. Further advantageous embodiments are described in the dependent claims. Embodiments of the present invention can be freely combined with each other if they are not mutually exclusive.

A time series may, for example, be a sequence of data points, measured typically at successive time instants spaced at uniform time intervals. The time series may comprise pairs or tuples (v, t), where "t" is the time at which value "v" is measured. The values v of time series may be referred to as sensor data. The sensor data of a time series may comprise values v of a measurand. A measurand may be a physical quantity, quality, condition, or property being measured. For example, measurands include one or more of, without limitation, temperature, central processing unit) (CPU) CPU usage, computing load, global mirror secondary write lag (ms/op) etc.

A measurand may, for example, be the global mirror secondary write lag (ms/op), which is the average number of milliseconds to service a secondary write operation for Global Mirror. The value may not include the time to service a primary write operation. Embodiments of the present invention can monitor the values of the global mirror secondary write lag to identify delays that occurred during the process of writing data to a secondary site (e.g., a detected increase may be a sign for a possible issue).

One or more time series may have values of a same measurand. For example, two temperature sensors at different locations each sending a respective time series that has values of the temperature and associated timestamps. In another example, two or more time series may be used to determine values of a single measurand. For example, a measurand that is the ratio of temperature and pressure may be defined using two time series, one of temperature values and the other of pressure values. In another example, each time series of the received time series has values of a respective distinct measurand. That is, the size of the first set of time series and the first group of measurands is the same since each measurand of the first group has a respective time series of the first set. The values of a measurand may have a pattern that does not conform to a predefined normal behavior of the values of the measurand, which may be referred to as an anomaly or problem.

The normal behavior of a measurand may be defined by one or more reference or threshold values. In one example, a reference value may be a maximum possible value of a measurand which, when exceeded by a value of the measurand, may indicate an anomaly. In one example, the reference values may comprise a lower and upper limit of an allowed range of values such that when a value of a measurand is out of the range, the value indicates an anomaly. In another example, the reference values may be values of a function or model that models the variations of the values of the measurand over time. In an additional example, embodiments of the present invention can learn the normal behavior from training data by a machine learning model (e.g., the anomaly detection algorithm may be the machine learning model). The trained machine learning model may be an equation or set of rules that predict an anomaly in input data. The rules may use comparisons with reference values.

In various embodiments of the present invention, if a component provides a measurand, then the values of the measurand are indicative of the component (e.g., indicative of the operation performance of the component). The values of the measurand are received as part of the first set of time series.

In example embodiments, the system can be a root cause analysis and performance system. In further example embodiments, the method can be a root cause analysis and performance method. For example, the anomaly may be a performance problem, a configuration problem and/or a software problem (e.g., a bug), etc.

Embodiments of the present invention can determine the third group by selecting measurands from the first group of measurands. In one example, an arbitrary set of measurands may be selected. In another example, the selection is based on a predefined selection criterion. The selection criterion may, for example, require that the selected measurand correlates with at least part of the second group of measurands. The selection criterion may, for example, require that the selected measurand is a measurand that is associated with a previously detected problem similar to, or the same as, the anomaly. In additional examples, the updating of the third group can include redetermining the whole third group. The resulting redetermined third group may or may not overlap with the third group. For example, the redetermining may be performed using another selection criterion.

The comparison of the values of the second group of measurands and the third group of measurands in the time window comprises a pair wise comparison of the values of the second group of measurands and the third group of measurands in the time window. In example embodiments, each measurand of the second group may be compared with all measurands of the third group. In one example, the pair wise comparison between a measurand of the second group and a measurand of the third group can include a comparison of a block of a range of values by block of a range of values, which can speed up the comparison process.

In various embodiments, a specific subset of components may include one or more components. The specific subset of more than one component may be components that belong to a same component class (e.g., representative of a single culprit). For example, in case that the anomalous data source is a storage system, the component class may be both physical and virtual switches and links. Another example of the component class may be a physical server and virtualized server, etc. Embodiments of the present invention can utilize a determination that no specific subset of the set of components of the given data source can be identified as a root cause of the anomaly to mean that multiple culprit components are identified. The multiple culprit components may not be of the same component class (e.g., do not provide a single culprit).

According to one embodiment, the updating of the third group of measurands comprises: removing one or more measurands from the third group, and/or adding one or more measurands to the third group. The updating process may enable an automatic and dynamic reaction so that the root analysis system can continue. In another example, the updating of the third group can include prompting a user to provide an update of the third group of measurands. In one example, the update of the third group may can include determining and taking into account that a selected component of the identified culprit components is not (e.g., anymore) a root cause.

According to one embodiment, the removed or replaced measurands are provided by a selected component of the set of components or of the identified culprit components. The selected component is a component that is not (or will not be) a cause of the anomaly because a respective problem has been solved (after the anomaly is detected) or if respective abnormal measurand values are caused by another component. The update of the third group of measurands can take into account that the selected component is not a root cause. For example, a user may provide an update of the third group of measurands taking into account the selected component as being not a root cause.

Figure 2:
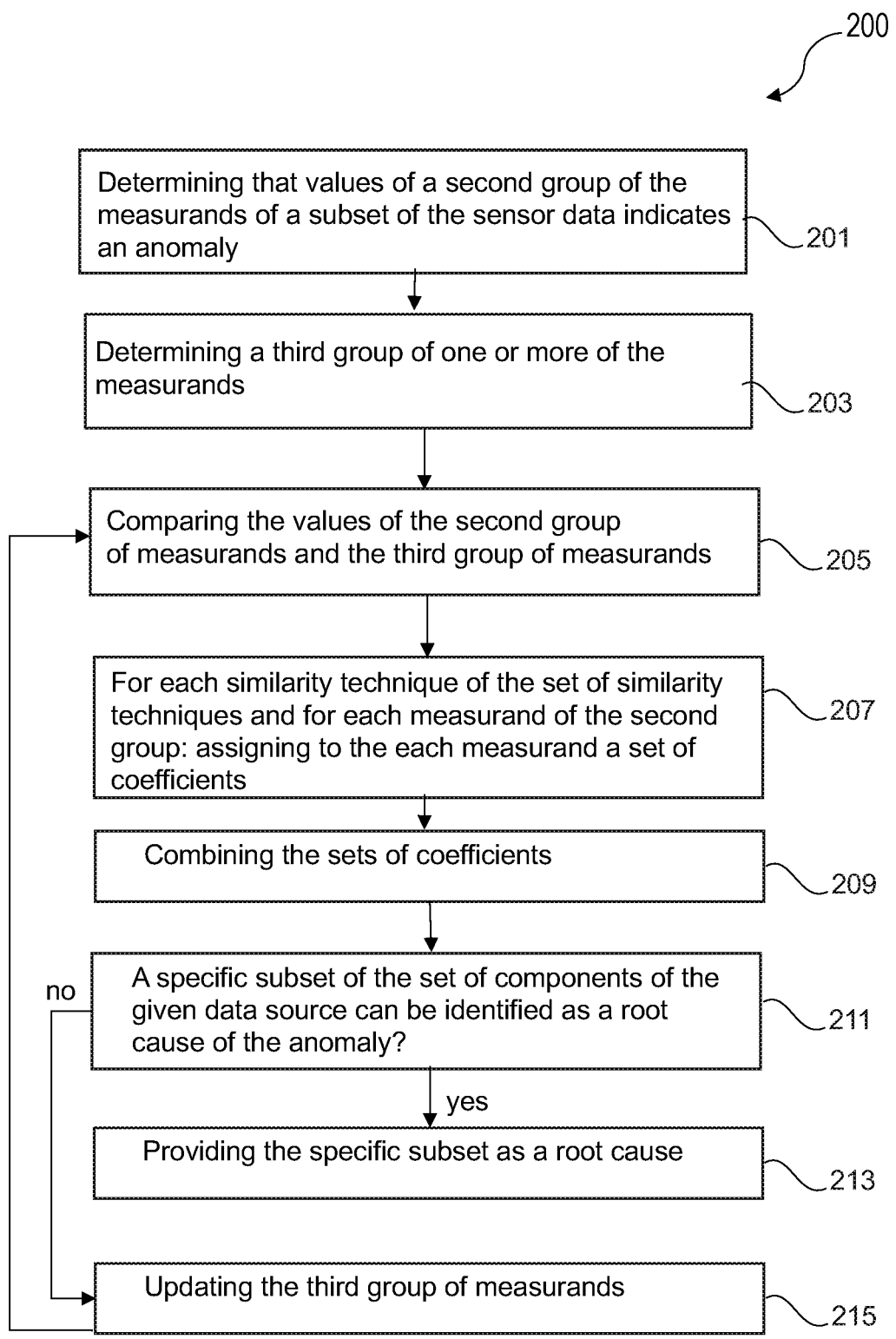
FIG. 2 is a flowchart of a method, in accordance with embodiments of the present invention.
Figure 3:
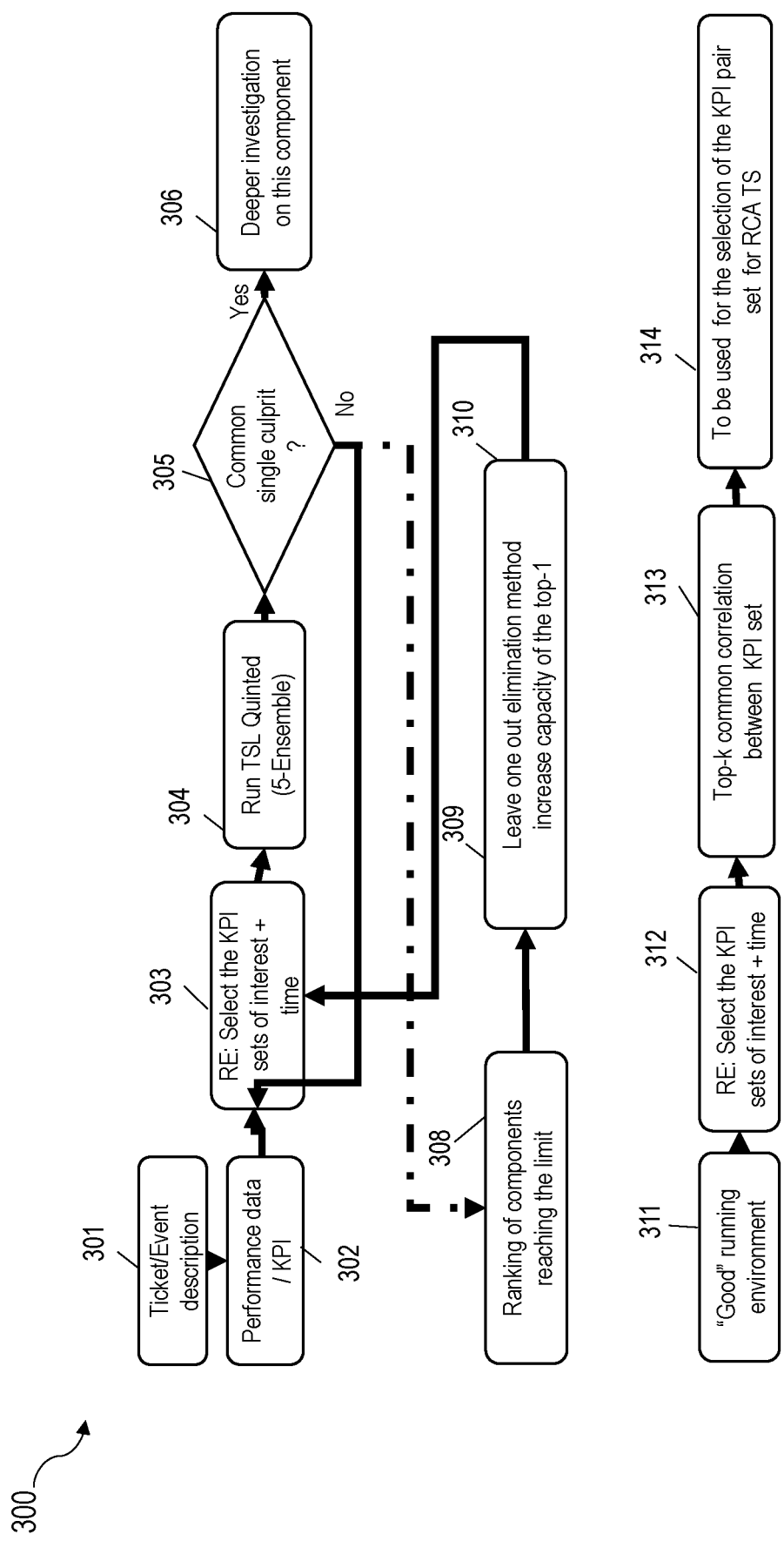
FIG. 3 is a diagram illustrating a method, in accordance with embodiments of the present invention.

According to one embodiment, the method further comprises excluding the selected component from the set of components for a next process iteration of embodiments of the present invention (discussed in further detail with regards to FIG. 2 and FIG. 3). Further, by removing the first most overloaded component, embodiments of the present invention can test whether the first most overloaded component is, or is not, the singular bottleneck for the entire system's performance.

Embodiments of the present invention recognize that the fact that a single culprit/subset of components cannot be identified may be due to the fact that the anomaly of the given data source is caused by a combination or cascade of individual problems at different components of the set of components (e.g., multiple culprits can be the cause of the anomaly). In one example, the individual problems may be caused by a single component that affects the measurand values of other components. For example, measurands behavior of multiple components on a same data flow in a storage system may be affected by a problem in one component of the data flow.

Accordingly, embodiments of the present invention recognize the advantages of reducing the number of investigated components (the set of components) by the present method by excluding and/or solving some problematic components. In an example embodiment, evaluating, a property that may be correlated with most of the anomalies in the given data source for each component of the set of components. For example, in case of a storage system, the overload degree may be a property that characterizes most of anomalies.

In another example, the most saturated component of the set of components may be the selected component. A saturated component may be a component that reaches the saturation or that is overloaded because a respective property value is steady, or the property value is in a sawtooth shape. The sawtooth condition denotes not necessarily that this value is reaching the limit but can be that a neighbor component is reaching the saturation. Various embodiments can determine the neighbor component by the next component that is traversed by the date flow.

Further embodiments of the present invention can configure the given data source (e.g., by increasing respective capacity) so that a solution of the saturation may be solved for that selected component. If after configuring the data source, the selected component is not saturated anymore or if the configuration reveals that the saturation is indeed not a real problem, then embodiments of the present invention can utilize such information in refining the selection of the third group of measurands for a next iteration. For example, measurands associated with the selected component may be removed from the third group of measurands.

According to one embodiment, the method further comprises ranking the set of components (or ranking the identified culprit components) in accordance with a predefined property of the set of components. In example embodiments, the selected component is the first ranked component. The first ranked component may be the component that contributes to the detected anomaly. For example, the property is an overload degree. In this example, the most overloaded component is first ranked. In an embodiment where the update is based on the selected component, the ranking may be performed after a predefined number N of iterations. For example, after the third group has been updated N times without success (e.g., no single culprit can be identified).

According to one embodiment, the subset of components is a single component of the set of components, which may further increase the accuracy of the root cause analysis.

According to one embodiment, the determining if a specific subset of the set of components can be identified comprises: for each measurand of the second group and for each measurand of the third group: combining the respective set of coefficients, resulting in a combined coefficient, and using the combined coefficients for the determining. For example, if the second group comprises a single measurand $M2_1$, the third group comprises two measurands $M3_1$ and $M3_2$ and the set of similarity techniques comprises three techniques ST1, ST2 and ST3, then two sets of coefficients may result from the present method. One set of coefficients for the pair ($M2_1$, $M3_1$) and another set of coefficients for the other pair ($M2_1$, $M3_1$).

Each of the two sets of coefficients has three coefficients each associated with a respective similarity technique. For example, the set of coefficients of the pair ($M2_1$, $M3_1$) may comprise $C_{ST1}^{11}$, $C_{ST2}^{11}$ and $C_{ST3}^{11}$ and the set of coefficients of the pair ($M2_1$, $M3_2$) may comprise $C_{ST1}^{12}$, $C_{ST2}^{12}$ and $C_{ST3}^{12}$. Each coefficient of the sets of coefficients may, for example, be a number. By comparing the values of the sets of coefficients, embodiments of the present invention can identify a root cause. For example, if a coefficient or combined coefficient is much higher than all other coefficients, then the component associated with that coefficient/combined coefficient may be a root cause. Using the combined coefficients can enable to make use of all similarity techniques in order to decide which is the root cause.

According to one embodiment, combining the set of coefficients comprises summing the set of coefficients. The sum of each set of coefficients of the sets of coefficients may, for example, be a weighted sum. In addition, each similarity technique of the set of similarity techniques is assigned a respective weight. In example embodiments, using the weights can enable to use only part of the set of similarity techniques (e.g., by assigning weight 0 to a non-desired technique).

Following the above example, the weighted sum may be defined as follows. The combined coefficient of the pair ($M2_1$, $M3_1$) may be defined as: $W_{ST1} \times C_{ST1}^{11} + W_{ST2} \times C_{ST2}^{11} + W_{ST3} \times C_{ST3}^{11}$, and the combined coefficient of the pair ($M2_1$, $M3_2$) may be defined as $W_{ST1} \times C_{ST1}^{12} + W_{ST2} \times C_{ST2}^{12} + W_{ST3} \times C_{ST3}^{13}$. The weights $W_{ST1}$, $W_{ST2}$ and $W_{ST3}$ are the weights of the three similarity techniques ST1, ST2 and ST3 respectively.

In one example, the weights may be user defined. In another example, the weights may automatically be selected from a predefined weight map comprising weights in association with the respective similarity techniques. The values of the weights may be dependent on the type of the given data source and/or dependent on the time of execution of the present method. For example, the given data source may be a datacenter storage area network (SAN). Embodiments of the present invention can monitor the datacenter SAN as a dynamic queuing system, which operates in distinct regions such as normal and saturated regions. For saturated regions, similarity techniques such as Manhattan, Pearson and DTW distances may be preferred. In such examples, the weights associated with the techniques may be higher than the other techniques of the set of techniques.

According to one embodiment, the method further comprises, before performing the comparison, normalizing in the time window values of measurands of the second and third groups of measurands. The normalization may be performed to the same range. In one example, embodiments of the present invention can use a min-max normalization to scale all compared measurands to the range [0, 1]. For example, the normalization is performed only within the time window. According to one embodiment, the set of similarity techniques comprises a L1/Manhattan distance, L2/Euclidean distance, dynamic time warping (DTW) distance, Spearman and Pearson metric.

According to one embodiment, the determining that values of a second group of one or more of the measurands of a subset of the sensor data indicates an anomaly comprises: receiving an event ticket from the data source, the event ticket indicative of the anomaly. For example, the event ticket may be indicative of a second set of time series and a time range (or time window) covering timestamps of the subset of sensor data. The second set of time series may be the time series that are used to monitor the second group of measurands. The second set of time series may be a subset of the first set of time series. For example, the event ticket can be a log file.

According to one embodiment, the determining that values of a second group of one or more of the measurands of a subset of the sensor data indicates an anomaly is performed in response to receiving an event ticket from a data source. The method further comprises repeating the method for each further received event ticket from the data source or another data source of the data sources.

According to one embodiment, a measurand of the second group comprises a measurand of the first group of measurands or a combination of measurands of the first group. According to one embodiment, each time series of the first set of time series comprises values of a respective measurand. In example embodiments, the number of measurands in the first group is equal to the number of time series in the first set of time series. Various embodiments of the present invention automatically perform the method, which can speed up the root cause analysis system. For example, the RCA troubleshooting of a complex incident may often take days or weeks when performed ad-hoc.

FIG. 1 is a diagram of a computer system 100, in accordance with example embodiments of the present invention. The computer system 100 may comprise data sources 101. In example embodiments, each data source of the data sources 101 may be a computer system, and each data source of the data sources 101 is configured to transfer data over a network. For example, the data source may be a public or private cloud storage system, a storage system which is addressable via an URL over a network, or any other accessible data source. The data source may include data for one or more sensors. In various embodiments, the sensor may be a device, module, machine, or subsystem whose purpose is to determine and/or monitor values of measurands in the corresponding environment.

The sensor may collect or acquire measurements at regular or irregular time intervals. The measurements may be provided as a time series. The time series comprises a series of data points (or values) indexed (or listed or graphed) in time order e.g., the time series comprises tuples of values and associated timestamps. A timestamp of a value (or data point) indicates the time at which the value is acquired. For example, the value of the time series may be a value of a measurand, where the measurand may be a physical quantity, condition, or property. Thus, each data source of the data sources 101 may provide a time series whose values are values of a measurand such as the temperature, pressure, CPU usage, etc. In one example, the data sources 101 may provide sensor data of a first group of measurands (named 'GRP1').

The computer system 100 includes a monitoring system 103. In various embodiments, the monitoring system 103 is configured to detect anomalies in data received from the data sources 101. In additional embodiments, the monitoring system 103 may be configured to process received time series.

Typically, hundreds of thousands of monitoring time series and event logs are captured by the monitoring system 103 as multivariate time series with fine granularity (e.g., minutes or seconds). In example embodiments, the monitoring system 103 can compare actual behavior of a measurand to a normal behavior of the measurand to produce comparison data. For example, a predefined deviation from the normal behavior may indicate an anomaly. For example, the anomaly may be caused by a memory outage when insufficient random-access memory (RAM) is available to accommodate data required to perform an operation.

In one example, the monitoring system 103 may be configured to identify unexpected values of measurands of the received time series. For example, the monitored measurands may comprise at least part of measurands of the first group of measurands GRP1 and/or combinations of measurands of the first group of measurands GRP1 (e.g., the data sources may provide measurands such as temperature, pressure and CPU usage), while the monitored measurands may comprise pressure, temperature and the ratio of temperature and pressure.

In one example, the monitoring system 103 may be configured to detect that an anomaly has occurred when values of a measurand of an incoming sample falls outside of a normal value range. The bounds of the range can be referred to as thresholds. For example, a score can be computed using the residuals derived from the difference between the received values and reference values. The score may indicate an anomaly when the score falls above the highest first outlier or below the lowest first outlier of the range. Utilization of a threshold can enable to identify anomalous behavior by the extent of deviation from a normal model of the data.

In another example, the monitoring system 103 may use an analytical method, such as a machine learning model, in order to detect the anomaly. In example embodiments, the machine learning model may be an autoencoder. For example, the autoencoder may be a feedforward neural network. The autoencoder can include an input layer having a number of nodes corresponding with respective measurands of the first group GRP1 of measurands. For example, the number of nodes in the input layer may be the number of measurands of the first group GRP1. The output layer may include the same number of nodes as the input layer and corresponding to the reconstructed values of the first group of measurands GRP1.

Various embodiments of the present invention can train the autoencoder network on data representing the normal behavior of the first group of measurands, with the goal of first compressing and then reconstructing the input variables. The training may include changing parameters values to minimize the reconstruction error. The training may be performed using a training dataset. Embodiments of the present invention can obtain the training dataset by collecting multiple metric data sets at multiple time. For example, one data set may be obtained from a respective device such as a SAN volume controller (SVC) device.

A metric may be a measurand. For example, the training set may be built using many devices at different time. Each device can provide multidimensional time series. The autoencoder may be trained on multiple multidimensional time series (with multiple time windows). For example, only sets that have a node with 4 ports with 8 Gbps speed may be filtered. For each entity set, single host-node-ports entity sets may be extracted, and the 35 high priority and aggregate metrics may be filtered in one file which may form the training set. During the dimensionality reduction, the network learns the interactions between the various variables and re-construct the variables back to the original variables at the output. If the data source degrades or has a problem, then embodiments of the present invention will start to see an increased error in the network reconstruction of the input variables. By monitoring the reconstruction error, embodiments of the present invention can detect an anomaly.

The computer system 100 includes a root cause analysis system 105. The root cause analysis system 105 may be configured to generate a set of probable root causes for an anomaly detected by the monitoring system 103. The set of probably root causes may include one or more potential root causes of the anomaly.

The monitoring system 103, data sources 101 and the root cause analysis system 105 may be interconnected by one or more networks. In one example, the network comprises the Internet. In another example, the network comprises a wireless link, a telephone communication, a radio communication, or computer network (e.g., a Local Area Network (LAN) or a Wide Area Network (WAN)). Although shown as remotely connected systems, the monitoring system 103 may be part of the root cause analysis system 105, in another example.

FIG. 2 is a flowchart of a method 200, in accordance with example embodiments of the present invention. The method 200 may be a root cause analysis and performance method. For the purpose of explanation, the method may be implemented in the computer system 100 (e.g., by the root cause analysis system 103) illustrated in previous FIG. 1 but is not limited to this implementation.

In various embodiments, data sources 101 can provide first set of time series. In example embodiments, each data source of the data sources can include a set of components. In the case of a storage system, the set of components may comprise at least one of a server, virtualized server (e.g., one or more virtual machine (VM)), physical network adapter, virtual network adapter, SAN fabric, physical switches and links, virtual switches and links, storage front end network adapter, storage frond end virtualization, and backend storage.

The first set of time series may comprise time series $ts1$, $ts2 \ldots tsN$. For example, the first set of time series may be streaming data that is continuously generated by the data sources 101. The root cause analysis system can incrementally process such data using the present method (e.g., without having access to all of the data). The incremental processing can may enable a stream processing of the received data and thus a real-time monitoring of the sensor data to act on data in real time. For example, large generated or acquired amounts of data may need to be analyzed in real time in order to facilitate acting on potential load balancing in the network. In another example, the first set of time series may be stored upon being received for performing an offline analysis of the received sensor data by the root cause analysis system.

The first set of time series provide values of a first group of measurands. Embodiments of the present invention can monitor the first set of time series (i.e., named 'SET1') using monitoring measurands in order to detect anomaly events. For example, each monitoring measurand of the monitoring measurands may be a measurand of the first group or a combination of measurands of the first group. In a further example, the monitoring may be performed on a predefined sample of data. The sample of data may incrementally be increased by each received data from the data sources 101. Following the above example, data of time series $ts1$, $ts2 \ldots tsN$ are received and accumulated. The monitoring may regularly be executed on accumulated data (e.g., the monitoring may be executed every hour so that for a current hour), the monitoring is executed on data of the current hour and data accumulated in hours before the current hour. In another example, the sample of data may be data received in a given time interval and which was not previously processed (e.g., the monitoring may incrementally process data received in each hour).

Various embodiments of the present invention can perform the monitoring to determine if the values of monitoring measurands have a normal behavior or not. For example, the values of each of the monitoring measurands may be compared with respective normal behavior data. In another example, the values of each of the monitoring measurands may be input to a trained machine learning model to predict if they deviate from a normal behavior. The results of the monitoring may be accessible by the root cause analysis system. For that, the monitoring may be performed by the root cause analysis system or by another remote computer system to which the root cause analysis system is connected.

For example, in step 201 of method 200, the root cause analysis system may determine that values of a second group (e.g., GRP2) of one or more of the measurands of a subset of the sensor data indicate an anomaly in a given time range or time window (e.g., a morning hour). In various embodiments, the determination indicates an anomaly in a subset of time series of the first set of time series SET1 during the time window. For example, the subset of time series can be received from an anomalous data source of the data sources 101. In an additional example, the root cause analysis system can receive an event ticket from the remote computer system. The event ticket indicates the second group of measurands, the time window and a time at which the event occurred. The time window may enable to focus the root cause search within the specified time window. In example embodiments, the time window may be centered on the event time, which can span 4-48 hrs. before and after the event time.

In step 203 of method 200, the root cause analysis system may determine a third group (e.g., GRP3) of one or more of the measurands (that are root cause candidates of the anomaly). In example embodiments, the third group may be selected from the first group of measurands GRP1 using the second group of measurands GRP2. For example, the root cause analysis system may be configured to search for root causes of the anomaly using a rules engine database of anomalies. The rules engine database of anomalies includes entries, where each entry of the entries is descriptive of an anomaly. For example, each entry of the entries includes values of attributes of a respective anomaly.

In example embodiments, the attributes of an anomaly can include the number of time series involved in the anomaly, the measurands involved in the anomaly, etc. Each entry of the entries may be associated with a set of candidate root cause measurands. The root cause analysis system may be configured to identify one or more entries that correspond with the detected anomaly and the respective one or more sets of candidate root cause measurands may form the third group GRP3. Alternatively, or additionally, embodiments of the present invention can prompt a user to provide some or all of the measurands of the third group GRP3. For example, the user may be presented with information indicative of the detected anomaly.

For example, in case of a storage system having elevated front-end response times as anomaly, the measurands of the third group may be: read/write response time to credit depletion, read/write response time to read data rate, read/ write response time to back-end read/write response time/queue time, and write response time to port to local node response time/queue time. In case of an insufficient input anomaly, the measurands may comprises: vdisk response to backend response, vdisk response to backend queue, vdisk response to host attributed delay, vdisk response to inter-node (port to local node), and vdisk response to gm secondary write lag.

Each measurand of the third group of measurands may be associated with a component of the anomalous data source. For example, a subset of the measurands of the third group may be obtained from the network adapter of the anomalous data source, etc. Thus, the third group of measurands may enable to analyze a number of potential root cause components. Embodiments of the present invention recognize that an accurate selection of the third group can be advantageous and enable spotting a single culprit.

In step 205, method 200 can utilize a set of one or more similarity techniques for comparing pair wise the values of the second group of measurands and the third group of measurands. That is, method 200 can compare compares every measurand of the second group GRP2 with all measurands of the third group GRP3. The number of comparisons performed in step 205 may be $N_{cmp}=N_{st} \times N_{GRP2} \times N_{GRP3}$, where $N_{st}$ is the number of similarity techniques, $N_{GRP2}$ is the number of measurands in the second group GRP2 and $N_{GRP3}$ is the number of measurands in the third group GRP3. For example, the set of similarity techniques may comprise L1/Manhattan, L2/Euclidean, DTW/Dynamic, Time Warping, Spearman and Pearson metrics. If, for example, the second group GRP2 comprises two measurands and the third group GRP3 comprises three measurands, then the number of comparisons to be performed in step 205 may be 5*2*3=30.

The comparison of a pair of measurands $M2_i$ and $M3_j$ (i=1, ..., $N_{GRP2}$, and j=1, ..., $N_{GRP3}$) of the second group and the third group respectively may, for example, be performed using the Euclidean distance method as follows: $Eucl(M2_i, M3_j) = \sum_{k=0}^{n}\sqrt{(M2_{i_k} \times M3_{j_k})^2}$, where n is the number of time points of the time series associated with the measurands $M2_i$ and $M3_j$ during the time window.

Before performing the comparisons, embodiments of the present invention recognize advantages to normalize the values of the compared measurands, which can enable an effective similarity comparison. The normalization may be performed to the same range. In one example, a min-max normalization to scale all compared measurands to the range [0, 1] may be used and the normalization is performed only within the time window.

In step 207, for each similarity technique of the set of similarity techniques and for each measurand $M2_i$ of the second group, method 200 can assign the measurand $M2_i$ a set of $N_{st}$ coefficients, where each coefficient of the set of coefficients is indicative of the comparison result of the each measurand $M2_i$ with a measurand $M3_j$ of the third group using the each similarity technique. For example, the set of coefficients $C_1^{ij}, C_2^{ij} \ldots C_{N_{st}}^{ij}$ may be provided as follows. For each distinct pair (i, j) of all possible pairs of measurands of the second and third groups, a record may be provided as follows:

|  | Similarity technique 1 | Similarity technique 2 | ... | Similarity technique $N_{st}$ |
|---|---|---|---|---|
| Pair ($M2_i$, $M3_j$) | $C_1^{ij}$ | $C_2^{ij}$ |  | $C_{N_{st}}^{ij}$ |

For example, the set of coefficients $C_1^{ij}, C_2^{ij} \ldots C_{N_{st}}^{ij}$ may indicate similarity between the two measurands $M2_i$ and $M3_j$ based on the comparisons performed by the set of similarity techniques. The set of coefficients may be numbers indicating the level of similarity.

In step 209, method 200 can combine the set of coefficients of each pair ($M2_i$, $M3_j$), resulting in a combined coefficient $Coef^{ij}$. In example embodiments, the combination can comprise a summation of the coefficients (e.g., $Coef^{ij}=\sum_{l=1}^{N_{st}}C_l^{ij}$ or weighted sum $Coef^{ij}=\sum_{l=1}^{N_{st}}W_l \times C_l^{ij}$), where the weights are assigned to the similarity techniques.

In addition, in step 211, method 200 can determine whether the combined coefficients enable identification of a specific subset of the set of components of the anomalous data source as a root cause of the anomaly. For example, the subset of components can be one or more components. In addition, the subset of components comprises a single component and may be referred to as a single culprit. The subset of components may belong to a same component class. The subset of components may enable a focused investigation of the anomaly. In an example where the anomalous data source is a storage system, the subset of components may belong to a same component class, where the component class may, for example, be both physical and virtual switches and links. Another example of the component class may be a physical server and virtualized server, etc.

For example, an outlier of combined coefficients may be distinguished from the other combined coefficients. The outlier may comprise combined coefficients higher than a predefined threshold. The threshold may for example be the average of all combined coefficients. Further embodiments of the present invention can determine whether the outlier of combined coefficients is associated with measurands of the third group, which are coming from a specific subset of components of the set of components. In other words, if the combined coefficients point to the same culprit set (measurands stemming from a component) with two or more similarity techniques of the set of techniques, then the set and respective sourcing component is most likely the root cause of the anomaly. Hence, a deeper investigation on this specific component may further be performed. Accordingly, in response to determining that a specific subset of the set of components of the anomalous data source can be identified as a root cause of the anomaly (step 211, yes branch), method 200 provides the specific subset as a root cause (step 213).

However, determining that the combined coefficients do not differ significantly from each other, so that an outlier cannot be identified, can indicate that the specific subset of components cannot be identified. Thus, in response to determining that no specific subset of the set of components of the anomalous data source can be identified as a root cause of the anomaly (step 211, no branch), method 200 can update the third group of measurands GRP3 (in step 215) and method 200 can perform steps 205 to 215 using the updated third group instead of the third group used in the previous iteration.

Method 200 can perform the updating of the third group of measurands by removing or replacing one or more measurands of the third group. In one example, the removed or replaced measurands may be determined as follows. A specific component of the anomalous data source may be identified and all measurands which are provided by that specific component may be removed or replaced in the third group. In this example, the repetition of the steps 205 to 215 may use the set of components excluding that specific component. The specific component may, for example, be randomly selected from the set of components. In another example, a user may be prompted in order to identify that specific component. In another example, the set of components may be ranked using a value of a property that is common for the set of components during the time window. The first ranked component may be the specific component. For example, the property be an overload degree.

FIG. 3 is a diagram 300 illustrating a method for root cause analysis, in accordance with example embodiments of the present invention. In various embodiments, the method of diagram 300 can be implemented in the computer system 100 (e.g., by the root cause analysis system 103 and optionally one or more other computing systems) illustrated in previous FIG. 1 but is not limited to this implementation.

At block 301, a root cause analysis system can receive an event ticket. The event ticket may indicate an anomaly event that occurred at a given data source. In example embodiments, the given data source may be a storage system having a set of components such as a sever and network adapter.

At block 302, the root cause analysis system may determine an anomaly set of measurands (e.g., key performance indicators (KPIs)), which caused the event. Then, at block 303, the root cause analysis system may determine (e.g., or select from the SET1) a root cause candidate set of measurands. In addition, the root cause analysis system can determine a time window that covers the event.

At block 304, the root cause analysis system can utilize a set of five similarity techniques to compare pair wise measurands of the anomaly set and the root cause candidate set. The set of similarity techniques includes an ensemble of three distances (i.e., L2/Euclidean, L1/Manhattan, DTW/Dynamic Time Warping) and two correlation measures (i.e., Spearman and Pearson). The ensemble may be reduced or augmented with additional methods (algos), also including here machine learning ML/ANN-based models for pattern recognition.

Further, at block 305, the root cause analysis system determines whether a single common culprit is identified. If the root cause analysis system points, based on the comparison results, to the same culprit sets (e.g., measurands stemming from a component) with two or more methods (out of five), then the root cause analysis system determines that the corresponding set and respective sourcing component is most likely the root cause of the problem (block 305, yes branch). Accordingly, the root cause analysis system proceeds to block 306 to facilitate the user starting a deeper investigation on this specific component.

If the root cause analysis system points to different components (block 305, no branch), then the root cause analysis system determines that the culprit is not well defined yet. Therefore, the root cause analysis system proceeds to block 307, to run the next troubleshooting step, by iterating the comparisons of blocks 303 through 305 using other metrics pairs. If the iteration of the comparisons points to the same component using different methods, then the root cause analysis system determines that the corresponding component is likely the culprit.

If the root cause analysis system does not identify a satisfactory component (i.e., no unique root) and all the possible measurand pairs still do not highlight one specific component, then the root cause analysis system can rank the involved components in respective decreasing order of overload degree. In an example embodiment, the root cause analysis system can start with a most overloaded component, then apply a leave one out elimination method (block 309). Accordingly, the root cause analysis system can enable to incrementally remove the top bottlenecks one at the time, while re-running (via process 310) the comparisons of blocks 303 through 305 after each removal.

In additional examples, the root cause analysis system can determine the root cause candidate set as described with steps 311 through 314. At step 311, a running data source may be provided, and at step 312 a set of the measurands that can be provided by the data source may be determined. At step 313, the root cause analysis system can determine the first k correlated measurands of the set. Then, the root cause analysis system can utilize the first k correlated measurands of the set to determine the root cause candidate set (step 314).

Figure 4:
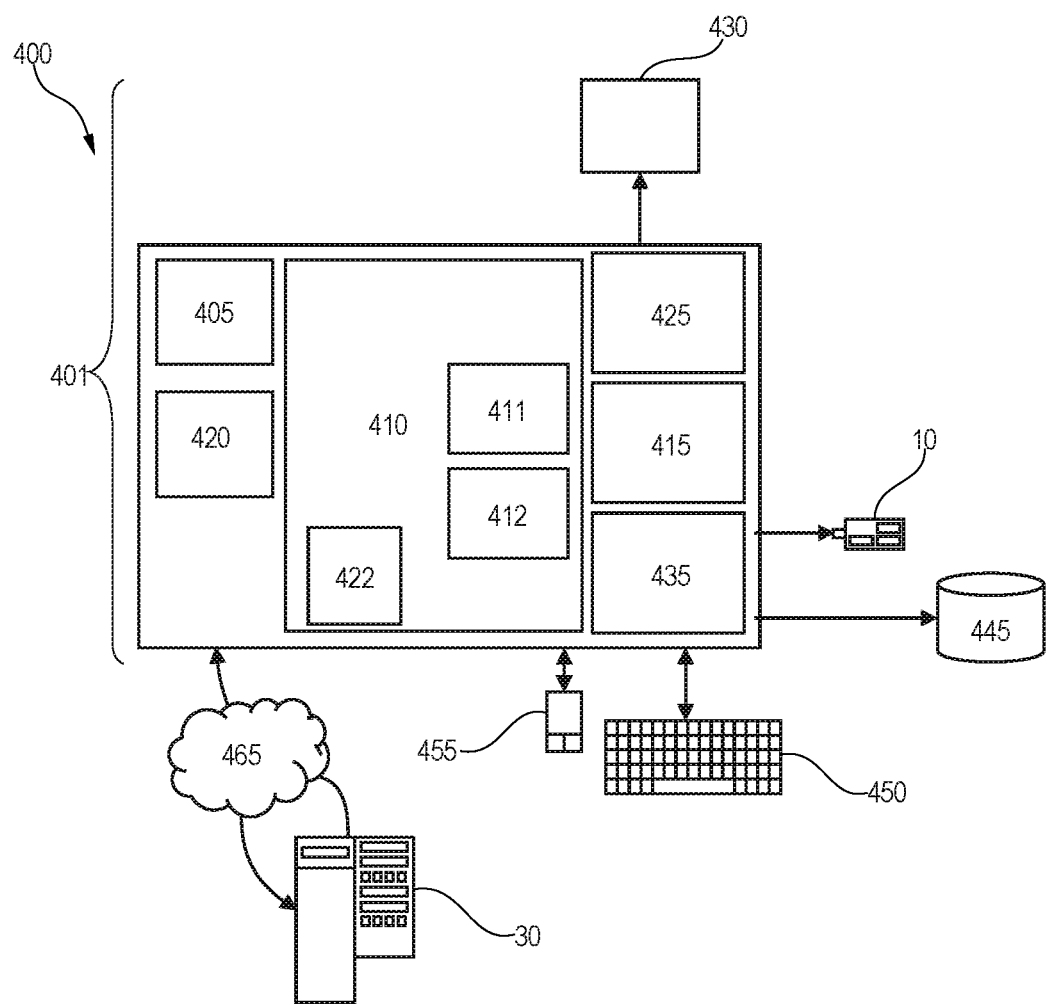
FIG. 4 represents a computerized system, suited for implementing one or more method steps, in accordance with embodiments of the present invention.

FIG. 4 represents a general computerized system 400 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 412, firmware 422, hardware (processor) 405, or a combination thereof. In exemplary embodiments, the methods described herein are implemented in software, as an executable program, and is executed by a special or general-purpose digital computer, such as a personal computer, workstation, minicomputer, or mainframe computer. The most general system 400 therefore includes a general-purpose computer 401.

In exemplary embodiments, in terms of hardware architecture, as shown in FIG. 4, the computer 401 includes a processor 405, memory (main memory) 410 coupled to a memory controller 415, and one or more input and/or output (I/O) devices or peripherals 10 and 445 that are communicatively coupled via a local input/output controller 435. The input/output controller 435 can be, but is not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 445 may generally include any generalized cryptographic card or smart card known in the art.

The processor 405 is a hardware device for executing software, particularly that stored in memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing software instructions.

The memory 410 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 410 can have a distributed architecture, where various components are situated remote from one another, but can be accessed by the processor 405.

The software in memory 410 may include one or more separate programs, each of which comprises an ordered listing of executable instructions for implementing logical functions, notably functions involved in embodiments of this invention. In the example of FIG. 4, software in the memory 410 includes instructions of software 412 (e.g., instructions to manage databases such as a database management system).

The software in memory 410 shall also typically include a suitable operating system (OS) 411. The OS 411 essentially controls the execution of other computer programs, such as possibly software 412 for implementing methods as described herein.

The methods described herein may be in the form of a source program of software 412, an executable program of software 412 (object code), script, or any other entity comprising a set of instructions to be performed (as an aspect of software 412). When a source program, then the program needs to be translated via a compiler, assembler, interpreter, or the like, which may or may not be included within the memory 410, so as to operate properly in connection with the OS 411. Furthermore, the methods can be written as an object-oriented programming language, which has classes of data and methods, or a procedure programming language, which has routines, subroutines, and/or functions.

In exemplary embodiments, a conventional keyboard 450 and mouse 455 can be coupled to the input/output controller 435. Other output devices such as the I/O devices 445 may include input devices, for example but not limited to a printer, a scanner, microphone, and the like. Finally, the I/O devices 10, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 445 can be any generalized cryptographic card or smart card known in the art. The system 400 can further include a display controller 425 coupled to a display 430. In exemplary embodiments, the system 400 can further include a network interface for coupling to a network 465. The network 465 can be an IP-based network for communication between the computer 401 and any external server, client and the like via a broadband connection. The network 465 transmits and receives data between the computer 401 and external systems 30, which can be involved to perform part, or all of the steps of the methods discussed herein. In exemplary embodiments, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (WLAN), a wireless wide area network (WWAN) a personal area network (PAN), a virtual private network (VPN), intranet or other suitable network system and includes equipment for receiving and transmitting signals.

If the computer 401 is a PC, workstation, intelligent device or the like, the software in the memory 410 may further include a basic input output system (BIOS) (e.g., included in firmware 422). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute software 412 stored within the memory 410, to communicate data to and from the memory 410, and to generally control operations of the computer 401 pursuant to the software. The methods described herein and the OS 411, in whole or in part, but typically the latter, are read by the processor 405, possibly buffered within the processor 405, and then executed.

When the systems and methods described herein are implemented in software 412, as is shown in FIG. 4, the methods can be stored on any computer readable medium, such as storage 420, for use by or in connection with any computer related system or method. The storage 420 may comprise a disk storage such as HDD storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
identifying data sources, the data sources configured to provide sensor data as a first set of one or more time series, the sensor data comprising values of a first group of measurands;
determining that values of a second group of one or more of the measurands of a subset of the sensor data indicate an anomaly, wherein the subset of the sensor data is provided by a given data source of the data sources, and wherein the given data source comprises a set of components;
determining a third group of one or more of the measurands as candidates for identifying a root cause of the anomaly;
assigning respective sets of coefficients to the measurands of the second group, wherein each coefficient of the respective sets of coefficients is indicative of a comparison result of a measurand of the second group with a measurand of the third group using a similarity technique of a set of similarity techniques;
determining that no specific subset of the set of components of the given data source can be identified as a root cause of the anomaly using the respective sets of coefficients;
updating the third group of measurands;
assigning respective sets of updated coefficients to the measurands of the second group, based, at least in part, on the updated third group; and
identifying a specific subset of the set of components of the given data source as the root cause of the anomaly using the respective sets of updated coefficients.

2. The computer-implemented method of claim 1, wherein the updating of the third group of measurands comprises:
removing one or more measurands from the third group; and
adding one or more measurands to the third group.

3. The computer-implemented method of claim 2, wherein the added one or more measurands are provided by a selected component of the set of components, and wherein the computer-implemented method further comprises:
excluding the selected component from the set of components for a next iteration.

4. The computer-implemented method of claim 3, further comprising:
ranking the set of components in accordance with a predefined property of the set of components and in a monotonic sorting order, wherein the selected component is a first ranked component.

5. The computer-implemented method of claim 4, wherein the property is an overload degree.

6. The computer-implemented method of claim 1, wherein the specific subset of the set of components is a single component of the set of components.

7. The computer-implemented method of claim 1, wherein the determining that no specific subset of the set of components of the given data source can be identified as the root cause of the anomaly further comprises:
    for respective measurands of the second group, combining the respective sets of coefficients, resulting in a set of combined coefficients; and
    determining that no specific subset of the set of components of the given data source can be identified as the root cause of the anomaly using the combined coefficients.

8. The computer-implemented method of claim 7, wherein combining the respective sets of coefficients includes summing the respective sets of coefficients.

9. The computer-implemented method of claim 1, further comprising:
    normalizing values of measurands of the second group of measurands and the third group of measurands prior to comparing the values of the second group of measurands and the third group of measurands.

10. The computer-implemented method of claim 1, wherein the set of similarity techniques includes a Manhattan distance, a Euclidean distance, a Dynamic time warping (DTW) distance, a Spearman metric, and a Pearson metric.

11. The computer-implemented method of claim 1, wherein the identifying the specific subset of the set of components of the given data source as the root cause of the anomaly further comprises:
    receiving an event ticket from the given data source, the event ticket indicative of the anomaly.

12. The computer-implemented method of claim 1, wherein the identifying the specific subset of the set of components of the given data source as the root cause of the anomaly initiates in response to receiving an event ticket.

13. The computer-implemented method of claim 1, wherein a measurand of the second group comprises a measurand selected from the group consisting of (i) a measurand of the first group and (ii) a combination of measurands of the first group.

14. The computer-implemented method of claim 1, wherein each time series of the first set of time series includes values of a respective measurand.

15. A computer system comprising:
    one or more computer processors;
    one or more computer readable storage media; and
    program instructions stored on the computer readable storage media for execution by at least one of the one or more processors, the stored program instructions comprising:
    program instructions to identify data sources, the data sources configured to provide sensor data as a first set of one or more time series, the sensor data comprising values of a first group of measurands;
    program instructions to determine that values of a second group of one or more of the measurands of a subset of the sensor data indicate an anomaly, wherein the subset of the sensor data is provided by a given data source of the data sources, and wherein the given data source comprises a set of components;
    program instructions to determine a third group of one or more of the measurands as candidates for identifying a root cause of the anomaly;
    program instructions to assign respective sets of coefficients to the measurands of the second group, wherein each coefficient of the respective sets of coefficients is indicative of a comparison result of a measurand of the second group with a measurand of the third group using a similarity technique of a set of similarity techniques;
    program instructions to combine the respective sets of coefficients for respective measurands of the second group, resulting in respective sets of combined coefficients; and
    program instructions to identify a specific subset of the set of components of the given data source as the root cause of the anomaly using the respective sets of combined coefficients.

16. The computer system of claim 15, wherein the program instructions to identify the specific subset of the set of components of the given data source as the root cause of the anomaly using the respective sets of combined coefficients comprise:
    program instructions to, in response to determining that no specific subset of the set of components of the given data source can be identified as the root cause of the anomaly, update the third group of measurands;
    program instructions to assign respective sets of updated coefficients to the measurands of the second group based, at least in part, on the updated third group;
    program instructions to combine the respective sets of updated coefficients for respective measurands of the second group, resulting in respective sets of updated combined coefficients; and
    program instructions to identify the specific subset of the set of components of the given data source as the root cause of the anomaly using the respective sets of updated combined coefficients.

17. The computer system of claim 15, wherein the specific subset of the set of components is a single component of the set of components.

18. A computer program product comprising:
    one or more computer readable storage media and program instructions stored on the one or more computer readable storage media, the stored program instructions comprising:
    program instructions to identify data sources, the data sources configured to provide sensor data as a first set of one or more time series, the sensor data comprising values of a first group of measurands;
    program instructions to determine that values of a second group of one or more of the measurands of a subset of the sensor data indicate an anomaly, wherein the subset of the sensor data is provided by a given data source of the data sources, and wherein the given data source comprises a set of components;
    program instructions to determine a third group of one or more of the measurands as candidates for identifying a root cause of the anomaly;
    program instructions to assign respective sets of coefficients to the measurands of the second group, wherein each coefficient of the respective sets of coefficients is indicative of a comparison result of a measurand of the second group with a measurand of the third group using a similarity technique of a set of similarity techniques;
    program instructions to combine the respective sets of coefficients for respective measurands of the second group, resulting in respective sets of combined coefficients; and
    program instructions to identify a specific subset of the set of components of the given data source as the root cause of the anomaly using the respective sets of combined coefficients.

19. The computer program product of claim 18, wherein the program instructions to identify the specific subset of the set of components of the given data source as the root cause of the anomaly using the respective sets of combined coefficients comprise:
- program instructions to, in response to determining that no specific subset of the set of components of the given data source can be identified as the root cause of the anomaly, update the third group of measurands;
- program instructions to assign respective sets of updated coefficients to the measurands of the second group based, at least in part, on the updated third group;
- program instructions to combine the respective sets of updated coefficients for respective measurands of the second group, resulting in respective sets of updated combined coefficients; and
- program instructions to identify the specific subset of the set of components of the given data source as the root cause of the anomaly using the respective sets of updated combined coefficients.

20. The computer program product of claim 18, wherein the specific subset of the set of components is a single component of the set of components.

\* \* \* \* \*